United States Patent [19]

Emori et al.

[11] Patent Number: 5,162,956
[45] Date of Patent: Nov. 10, 1992

[54] CASSETTE HOLDER ASSEMBLY HAVING MULTIPLE PROJECTIONS DIFFERENTIATED IN DIMENSION

[75] Inventors: Masashi Emori; Masao Ohyama, both of Tokyo, Japan

[73] Assignee: Sony Corporation, Japan

[21] Appl. No.: 583,995

[22] Filed: Sep. 18, 1990

[30] Foreign Application Priority Data

Sep. 20, 1989 [JP] Japan .................. 1-243878

[51] Int. Cl.$^5$ .................. G11B 15/675; G11B 23/087
[52] U.S. Cl. .................. 360/96.5; 360/96.6; 242/199
[58] Field of Search .................. 360/96.5, 96.6, 95, 360/93, 85, 132; 242/199, 198, 197, 200, 201

[56] References Cited

U.S. PATENT DOCUMENTS

| | | | |
|---|---|---|---|
| 4,683,510 | 7/1987 | Meguro | 360/132 |
| 4,697,702 | 10/1987 | Urayama | 242/199 |
| 4,799,117 | 1/1989 | Ohyama | 360/96.5 |
| 4,803,575 | 2/1989 | Nishimura et al. | 360/94 |

FOREIGN PATENT DOCUMENTS

| | | |
|---|---|---|
| 0286751 | 10/1988 | European Pat. Off. . |
| 62-108556 | 8/1987 | Japan . |
| 62-180554 | 8/1987 | Japan . |
| 2173170 | 10/1986 | United Kingdom . |

Primary Examiner—John H. Wolff
Assistant Examiner—Craig A. Renner
Attorney, Agent, or Firm—Ronald P. Kananen

[57] ABSTRACT

A cassette holder for a tape player is provided with a pair of lock releasing projections which are engageable with a pair of grooves formed on the lower surface of a sliding shutter of a tape cassette. One of the projection has a width equal to or slightly smaller than the width of the groove so as to permit engagement with the grooves on the sliding shutter for restricting movement of the tape cassette in a direction transverse to a back and forth direction.

5 Claims, 9 Drawing Sheets

CASSETTE HOLDER ASSEMBLY HAVING MULTIPLE PROJECTIONS DIFFERENTIATED IN DIMENSION

BACKGROUND OF THE INVENTION

1. Field of the Invention

The present invention relates generally to a cassette holder assembly for a tape player for recording and/or reproducing information on a recording medium tape housed in a cassette casing. More specifically, the invention relates to a cassette holder assembly which is particularly adapted to those types of tape cassettes having a sliding shutter for opening and closing the lower side tape access opening, such as a digital audio tape (DAT) cassette.

2. Description of the Background Art

The U.S. Pat. No. 4,683,510, issued on Jul. 28, 1987 discloses one typical construction of a DAT cassette which has a sliding shutter which can be locked between an open position and a closed position. The sliding shutter is locked at the respective open and closed positions by means of a locking head integrally formed with a resiliently deformable locking arm or locking claw.

On the other hand, British Patent 2,173,170, issued on Dec. 16, 1987 discloses a DAT cassette which has a symmetric groove construction with a pair of grooves formed on the lower surface of the sliding shutter. A shutter locking claw projects into one of the grooves. Symmetric grooves are intended to provide stable shutter handling operation upon sliding the shutter between the closed position, for blocking access of the tape through the lower opening of the cassette casing, and the open position, for permitting access of the tape. Furthermore, the symmetric groove constructions on the lower side face of the shutter may enhance the appearance of the DAT cassette in comparison with single-groove constructions.

In general, tape cassette players are required to accurately position an associated tape cassette at a loading position. Therefore, various constructions of cassette positioning means are provided for cassette holders of tape cassette players, to accomplish the accurate positioning of the tape cassette. The cassette positioning means has to restrict movement of the tape cassette in a back and forth direction and a direction transverse thereto. Typically, the cassette holder is provided with a resilient member for depressing the tape cassette onto the bottom plate of the cassette holder, for preventing play motion of the cassette within the cassette holder. Also, the cassette holder may be provided with a projection for restricting movement of the tape cassette in a back and forth direction and guide members for restricting tape cassette movement in a transverse direction.

Such cassette positioning means necessarily increase the number of parts required for forming the cassette holder and thus makes the structure of the cassette holder complicated.

SUMMARY OF THE INVENTION

Therefore, it is an object of the present invention to provide a cassette holder for a tape player which can accurately position a tape cassette without requiring separately formed positioning means.

In order to accomplish the aforementioned and other objects, a cassette holder for a tape player, in accordance with the present invention, is provided with a pair of lock-releasing projections which are engageable with a pair of grooves formed on the lower surface of a sliding shutter of a tape cassette. One of the projections has a width equal to or slightly smaller than the width of the groove so as to permit engagement with the grooves on the sliding shutter for restricting movement of the tape cassette in a direction transverse to a back and forth direction.

According to one aspect of the invention, a cassette holder for a tape player which records and reproduces information on a recording-medium tape housed within a cassette casing with a sliding shutter for openably closing tape access opening defined at lower side of the cassette casing, comprises:

a cassette holder body defining therein a tape cassette receptacle space, the cassette holder body having a bottom plate forming the bottom of the cassette receptacle space; and first and second projections projecting from the bottom plate of the cassette holder and oriented in mutually spaced apart relationship to each other, the projections being engageable with a pair of grooves in which locking heads for locking the sliding shutter at an open position and a closed position are projected, one of the pairs of the projections and grooves being differentiated in width in such a manner that one of pair of the groove and the first projection interengaging with each other being substantially in conformance to each other and the other pair of the groove and the second projection being engaged to each other in loose fashion.

In the preferred construction, the second projection is provided with a narrower width than the associated groove. Preferably, the width of the second projection is approximately half of the width of the associated groove.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Referring now to the drawings, the preferred embodiment of a cassette holder, according to the present invention, is specifically adapted to a tape player for a DAT cassette or equivalent type tape cassette which has a sliding shutter with twin and essentially symmetric grooves (hereafter referred to as "tape cassette"), which tape player is generally represented by the reference numeral 1. In advance of a discussion of the preferred embodiment of the cassette holder, construction of a DAT cassette will be discussed briefly in order to facilitate peripheral understanding of the present invention.

Figure 6:
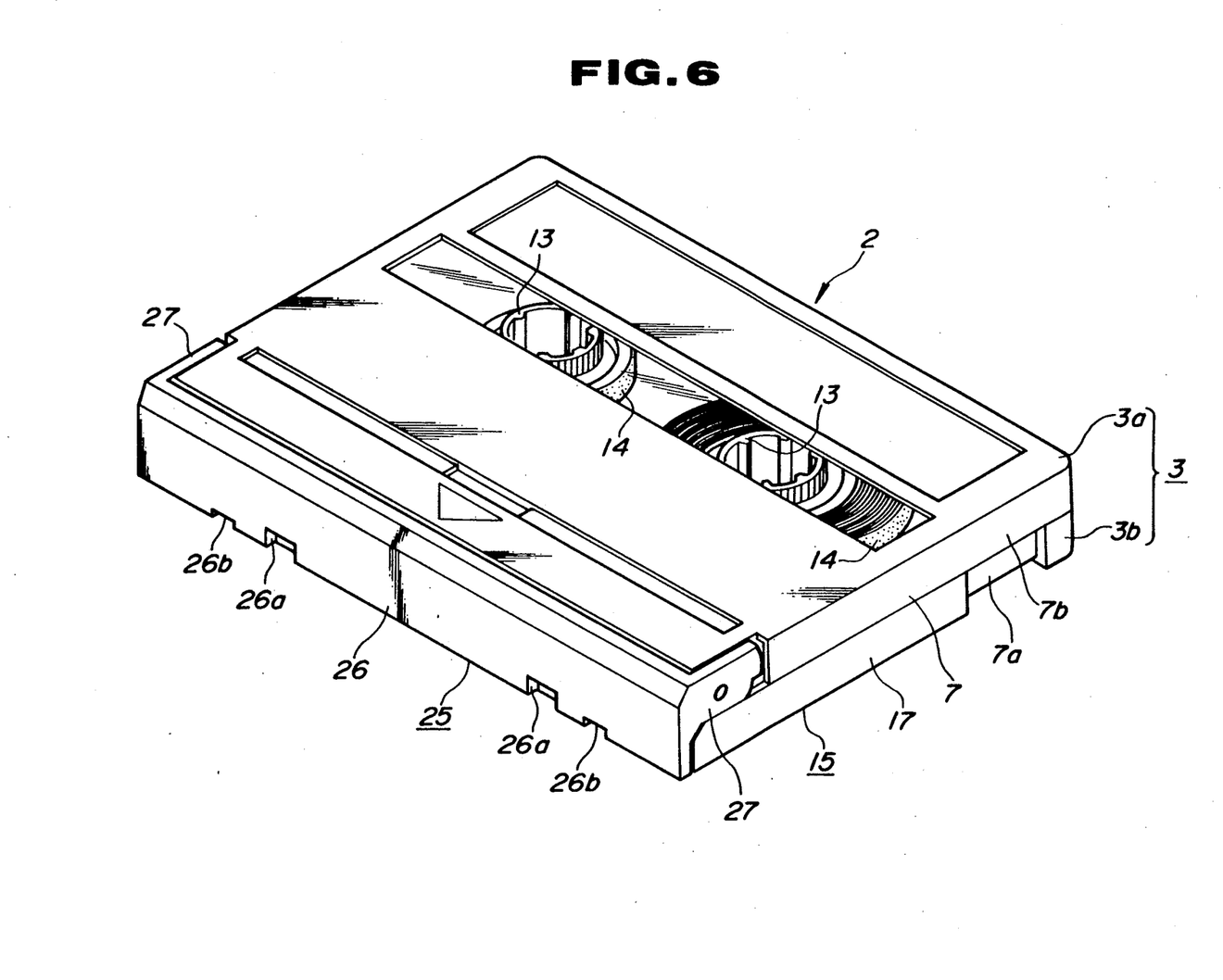
FIG. 6 is a perspective view of a tape cassette adapted to be handled by the preferred embodiment of the cassette holder of the invention.
Figure 7:
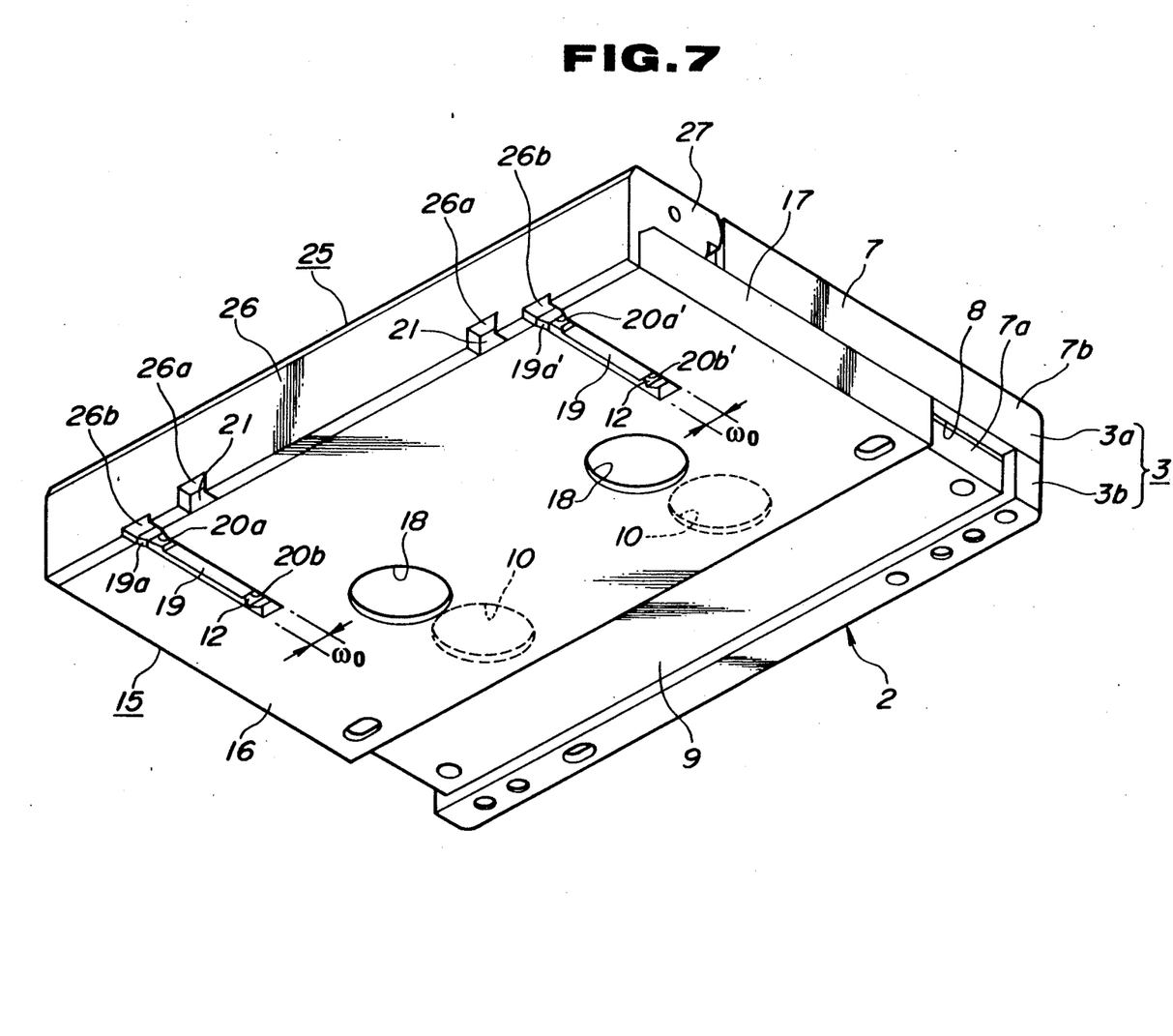
FIG. 7 is a perspective view of the tape cassette of FIG. 6, but seen from the bottom side.
Figure 8:
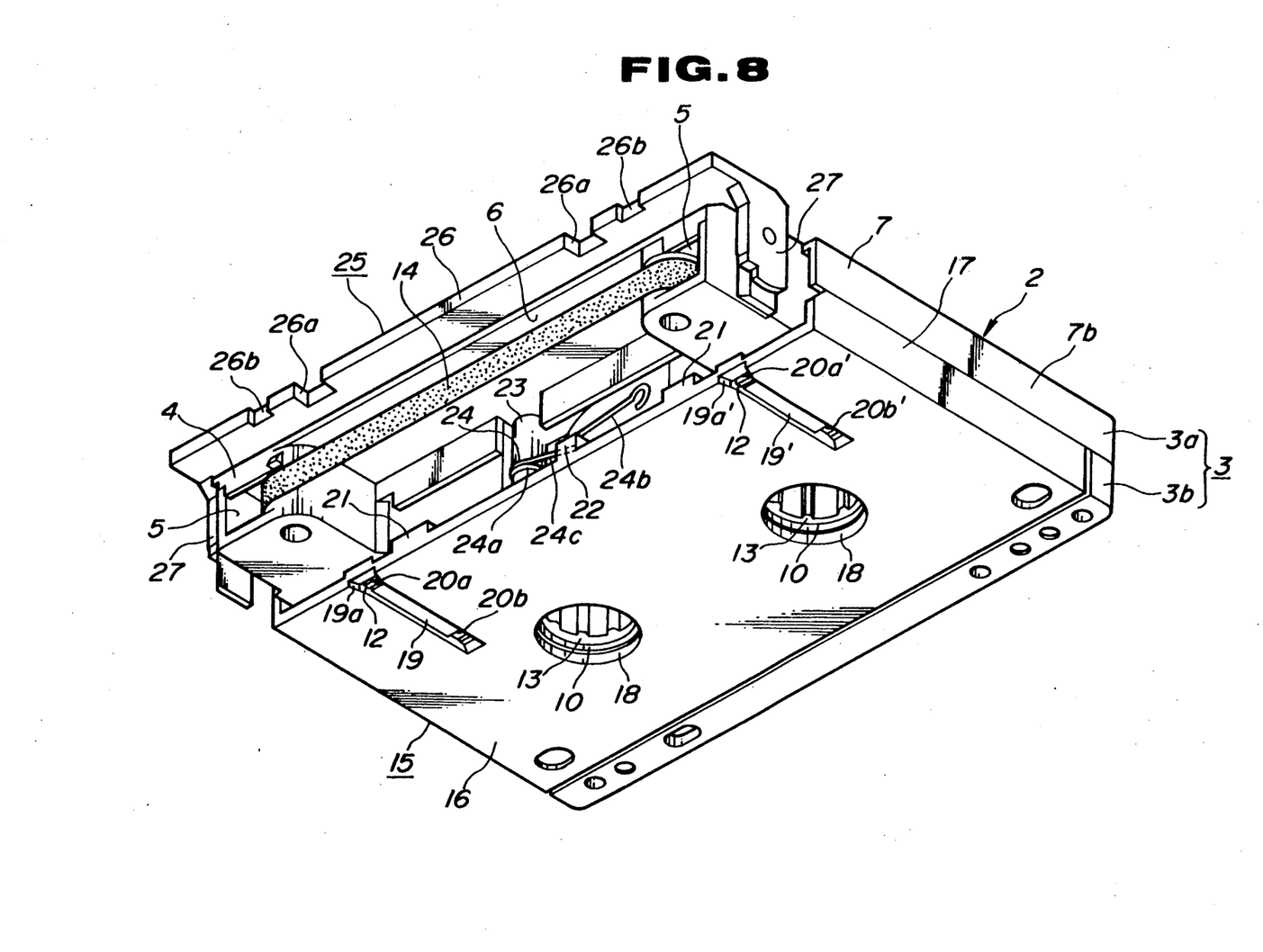
FIG. 8 is a perspective view similar to FIG. 7 but showing the state wherein a pivotal lid and sliding shutter are placed at open positions.

Referring primarily to FIGS. 6–8, for example, the tape cassette 2 has a cassette casing 3 made of a synthetic resin and constituted by an upper half 3a and a lower half 3b. The cassette casing has a front wall 4 having a pair of tape path openings 5. A lower end and front end opened clearance 6 is formed in front on the front wall 4. A tape 14 passes across this clearance 6. The side walls 7a of the lower half 3b have outer surfaces slightly inwardly offset from the outer surfaces of the side walls 7b of the upper half 3a, which side walls 7b and 7a of the upper and lower halves 3a and 3b form side wall 7 of the cassette casing 3. At the outer edge portion of the side walls 7b and 7a, thin guide grooves 8 (only one is shown) are defined.

A bottom plate 9 of the cassette casing 3 is formed with a pair of reel base receptacle openings 10. Locking claws 11 are also formed with the bottom plate 9. Tape reels 13 are provided at corresponding orientations to the reel base receptacle openings 10 for receiving the reel base. As can be seen, the locking claws 11 are provided with an essentially V-shaped or U-shaped locking head 12. These locking heads 12 are designed to be projected from the lower surface of the bottom plate 9.

Opposing the bottom plate 9, a sliding shutter 15 is provided, which is made of a synthetic resin. The sliding shutter 15 is designed to extend over the major part of the bottom of the tape cassette 2 for closing the lower end opening of the clearance 6 and closing the reel base receptacle openings 10 at the initial or unloaded position. The sliding shutter 15 has a major flat section 16 oriented in a parallel relationship with the bottom plate 9 and side plates 17 extending perpendicular to the major flat section 16 from the both transverse edges of the shutter 15. The free end edges 17a of the side plates 17 are bent for sliding engagement with the guide grooves 8 on the side walls 7 of the cassette casing. The outer surface 17 is designed to form a flush surface with outer surface of the side wall 7b of the upper half 3a.

A pair of essentially circular holes 18 are formed through the sliding shutter 15. These holes 18 are oriented to be placed at a position offset to the reel base receptacle openings 10 at the initial position and to be aligned with the reel base receptacle openings 10 when the sliding shutter 15 is slidingly shifted to an open position. Also, the major section 16 of the sliding shutter 15 is formed with a pair of parallel locking head receptacle grooves 19 and 19' extending in a back and forth direction. The locking head receptacle grooves 19 and 19' extend to the front end of the major section 16 to open to the front edges 19a and 19a', where both peripheral edges are tapered in a direction away from each other for providing wider path. Locking holes 20a, 20b and 20a' and 20b' are opened to the locking head receptacle grooves 19 and 19'. The locking holes 20a and 20a' are oriented in the vicinity of the front edges 19a and 19a' of the grooves 19 and 19' and the locking holes 20b and 20b' are oriented in the vicinity of the rear end of the grooves 19 and 19'. The depth of the locking head receptacle grooves 19 and 19' is designed to receive therein the locking heads 12 of the locking claws 11 extending through one of the locking holes 20a, 20a' or 20b, 20b'. Namely, at the initial position of the sliding shutter 15, the locking heads 12 engage the locking holes 20b and 20b' for locking the sliding shutter at the initial position, and at the opened position of the sliding shutter, the locking heads 12 engage the locking holes 20a and 20a'.

The sliding shutter 15 is provided with a pair of thin projections 21 extending upwardly from the front edge of the major section 16. The thin projections 21 are oriented in a transversely and inwardly offset position relative to the front edges 19a and 19a' of the locking head receptacle grooves 19 and 19'. A spring rest projection 22 is also formed at the front edge portion of the major section 16 of the sliding shutter. The spring rest projection 22 receives one end 24c of a torsional coil spring 24 which has a coil section 24a wound around a spring rest pin 23. The spring 24 has another end 24b abutting the front surface of the front wall 4 of the cassette casing 3. With the shown construction, the sliding shutter 15 is normally biased toward the initial position by means of the torsional coil spring 24.

The tape cassette 2 is further provided with a front-end closing pivotal lid 25. The pivotal lid 25 has a major front end piece 26 and a pivoting arms 27. The front end piece 26 is oriented in a parallel relationship to the front wall 4 of the cassette casing at the initial position for closing the front end opening of the clearance 6. The pivoting arms 27 are oriented in a parallel relationship with the front end portion of the side walls 7 to be pivotally supported thereon. The pivotal lid 25 thus constructed is designed to be locked at the initial position and opened position with known construction of a locking mechanism (not clearly shown). The locking mechanism of the pivotal lid 25 is cooperated with the sliding shutter 15 for establishing mutually associated interlocking at the initial position.

The front end piece 26 of the pivotal lid 25 is formed with a pair of wider cut-outs 26a and a pair of narrower cut-outs 26b. The wider cut-outs 26a are oriented at transverse positions corresponding to the projections 21 of the sliding shutter 15. Likewise, the narrower grooves 26b are oriented to the transverse position corresponding to the front edges 19a and 19a' of the locking head receptacle grooves 19 and 19'.

A tape player for recording and reproducing information on a magnetic tape of a DAT cassette set forth above is described as follows. Referring primarily to FIGS. 1-5, for example, the tape player has a metallic support frame 28, on which a mechanical chassis 29 is supported. The mechanical chassis 29 is arranged in tilted fashion to tilt downwardly toward the front end in an angle approximately 45° and rigidly fixed on the support frame 28. A cassette receptacle space 30 to which the DAT cassette 2 is loaded is formed on the front half of the mechanical chassis 29. Three positioning pins 31 project from the mechanical chassis 29 for positioning the DAT cassette 2 in the cassette receptacle space 30. A pair of reel bases 32 are also provided in the cassette receptacle space 30.

Figure 1:
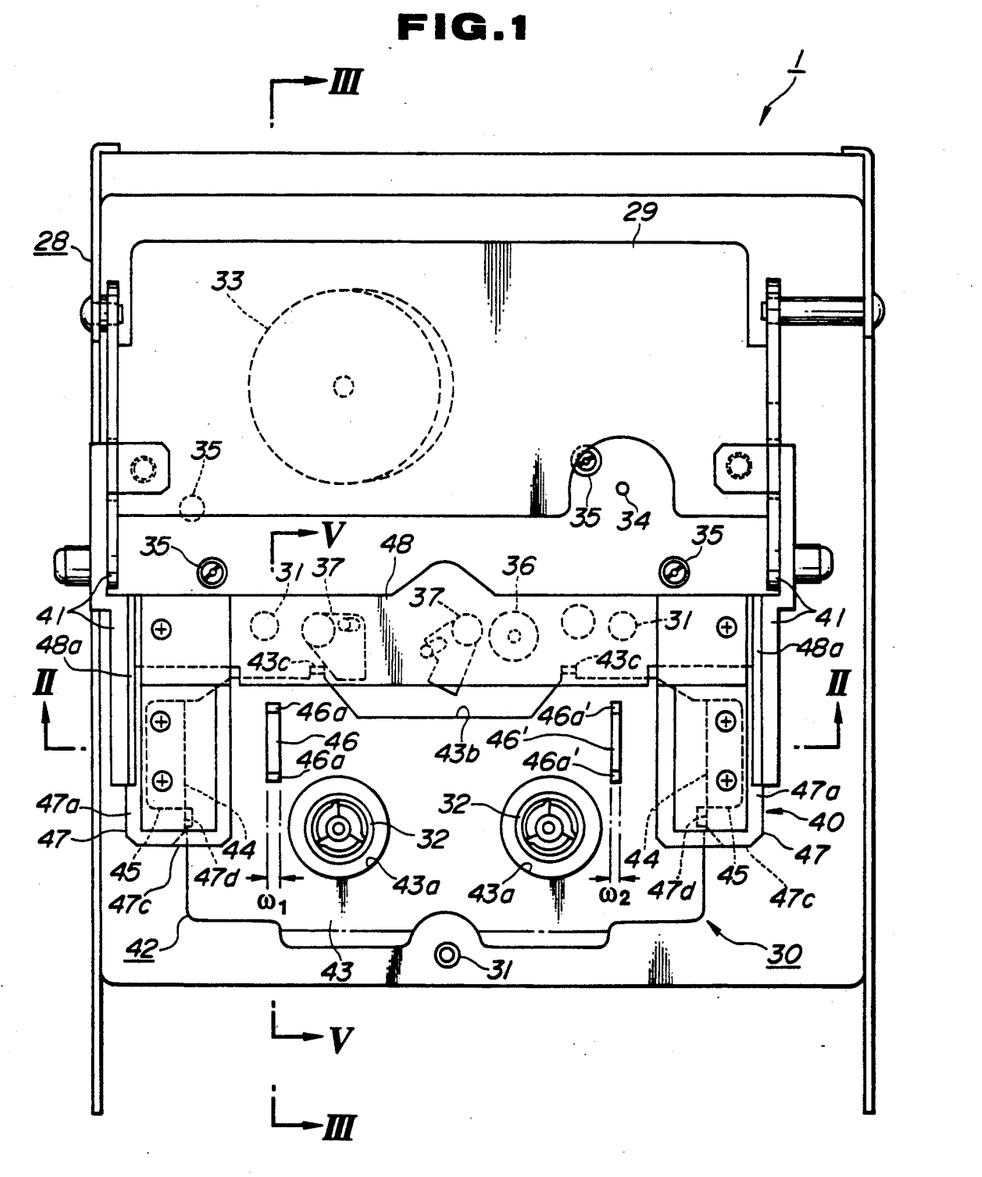
FIG. 1 is a plan view of the preferred embodiment of a cassette holder for a tape player, according to the present invention.
Figure 2:
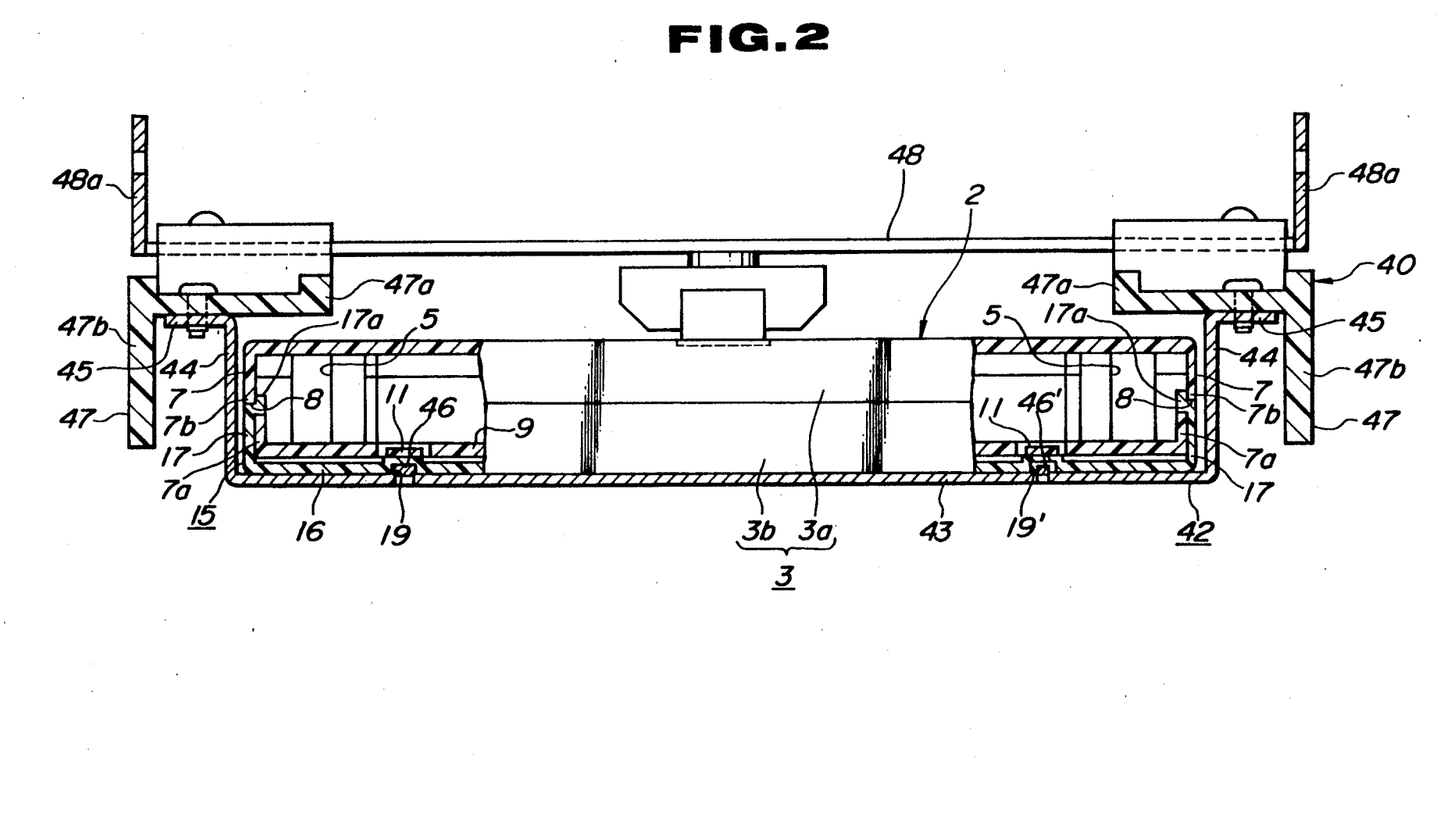
FIG. 2 is a section taken along line II—II of FIG. 1.

A rotary head drum 33, a capstan 34, a stationary tape guide 35, a pinch roller 36, tape guide blocks 37 for wrapping the tape around the rotary head drum and so forth are provided on the mechanical chassis in per se known manner for driving tape across the rotary head drum for recording and reproducing information thereon. In the shown embodiment, the information to be recorded on the tape of the DAT cassette 2 is a pulse-code-modulated (PCM) audio signal.

The tape player also has a front panel 38 defining therethrough a cassette receptacle opening 38a with a closure lid 39.

The preferred embodiment of a cassette holder 40 is provided in the tape player for positioning the DAT cassette 2 between a loading position and an eject position. The cassette holder 40 is connected to ends of pivotal arms 41 at its front end, which pivotal arms are pivotally connected to the support frame 28 for pivotal movement thereabout. At the eject position, the cassette holder 40 is projected outwardly through the cassette receptacle opening 38a of the front panel so that the DAT cassette 2 can be set thereinto or removed therefrom, as shown by solid line in FIG. 3. On the other hand, at the loaded position, the DAT cassette 2 is placed within the cassette receptacle space 30 while engaging the tape reels with the reel bases 32, as shown by phantom lines in FIG. 3. As can be seen from FIG. 4, for example, the cassette holder 40 has a major section 42 in which the DAT cassette is set. A pair of guides members 47 are provided at both transverse sides of the major section, and an upper plate 48 extends over the upper ends of the guides. The major section 42 has a bottom plate 43 which is formed into a generally rectangular shaped configuration having a size slightly greater than the sliding shutter 15 of the DAT cassette 2. A pair of side plates 44 extends upwardly from the rear transverse edges of the bottom plate 43. The side plates 44 are respectively bent horizontally to form mounting sections 45. The bottom plate 43 is formed with circular openings 43a. The bottom plate 43 is also formed with an essentially trapezoid-shaped cut-out 43b with essentially L-shaped extension pieces 43c extending from the rear edge thereof.

The bottom plate 43 is further formed with a pair of elongated projections 46 and 46' projecting from the upper surface thereof. These projections 46 and 46' serve for releasing locking engagement of the locking heads 12 and 12' and the locking holes 20a, 20a' or 20b, 20b'. Therefore, in the following discussion, the projections 46 and 46' will be referred to as "lock releasing projections". As can be seen, the lock releasing projections 46 and 46' respectively have tapered front and rear ends 46a and 46a'. The lock releasing projections 46 and 46' have heights corresponding to, or slightly shallower than, the depth of the locking grooves 19 and 19' and have length slightly shorter than the lengths of the locking grooves 19 and 19'. As can be seen from FIG. 1, the width of the lock releasing projections 46 and 46' are differentiated from each other. Namely, as seen from FIG. 1, the width $W_1$ of the lock releasing projection 46 essentially corresponds or slightly smaller than the width $W_0$ of the locking groove 19 (see FIG. 7). On the other hand, the width $W_2$ of the lock releasing projection 46' is smaller than the width $W_0$ of the locking groove 19'. Practically speaking, the width $W_2$ is half of the width $W_0$ of the locking groove 19'. In the practical embodiments, respective widths of the locking grooves 19 and 19' and the lock releasing projections 46 and 46' are as follows:

$W_0 = 2.0$ mm (tolerance $+0.5$ mm, $-0$ mm)
$W_1 = 1.9$ mm (tolerance $+0$ mm, $-0.1$ mm) and
$W_2 = 1.0$ mm (tolerance $\pm 0.1$ mm)

Figure 4:
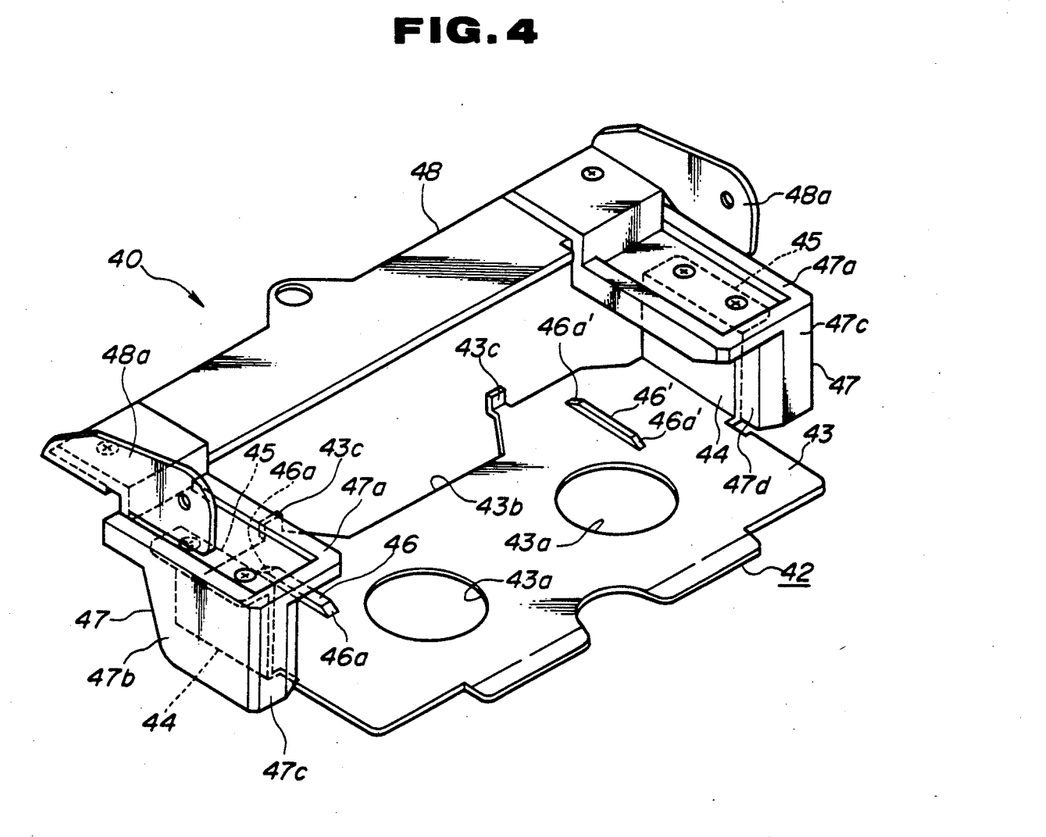
FIG. 4 is a perspective view of the major part of the preferred embodiment of the cassette holder of the invention.

Each of the guide members 47 has an upper plate 47a of an essentially rectangular configuration, a side plate 47b and a front plate 47c. The guide members 47 are formed of a synthetic resin. The upper plates 47a are secured onto the mounting section 45 of the major section 42 by means of fastening screws. The front plates 47c have the inner peripheral surfaces 47d lying substantially flush with the inner peripheral surface of the side walls 44.

The upper plate 48 is formed in an elongated strip shape having both transverse ends fixed onto the upper plate 47a of the guide members 47. The upper plate 48 has a pair of vertical extensions 48a extending from both transverse edges thereof. Pivotal arms 41 are connected to the vertical extensions. A bias spring 49 is supported on the lower surface of the upper plate 48 for downwardly depressing the DAT cassette 2 inserted into the cassette holder 40.

The cassette holder 40 thus constructed defines a transversely elongated space defined by the bottom plate 42, the side plates 44 and the guide members 47, and the upper plate 48. The cassette holder 40 thus receives the DAT cassette 2 in this space.

Figure 3:
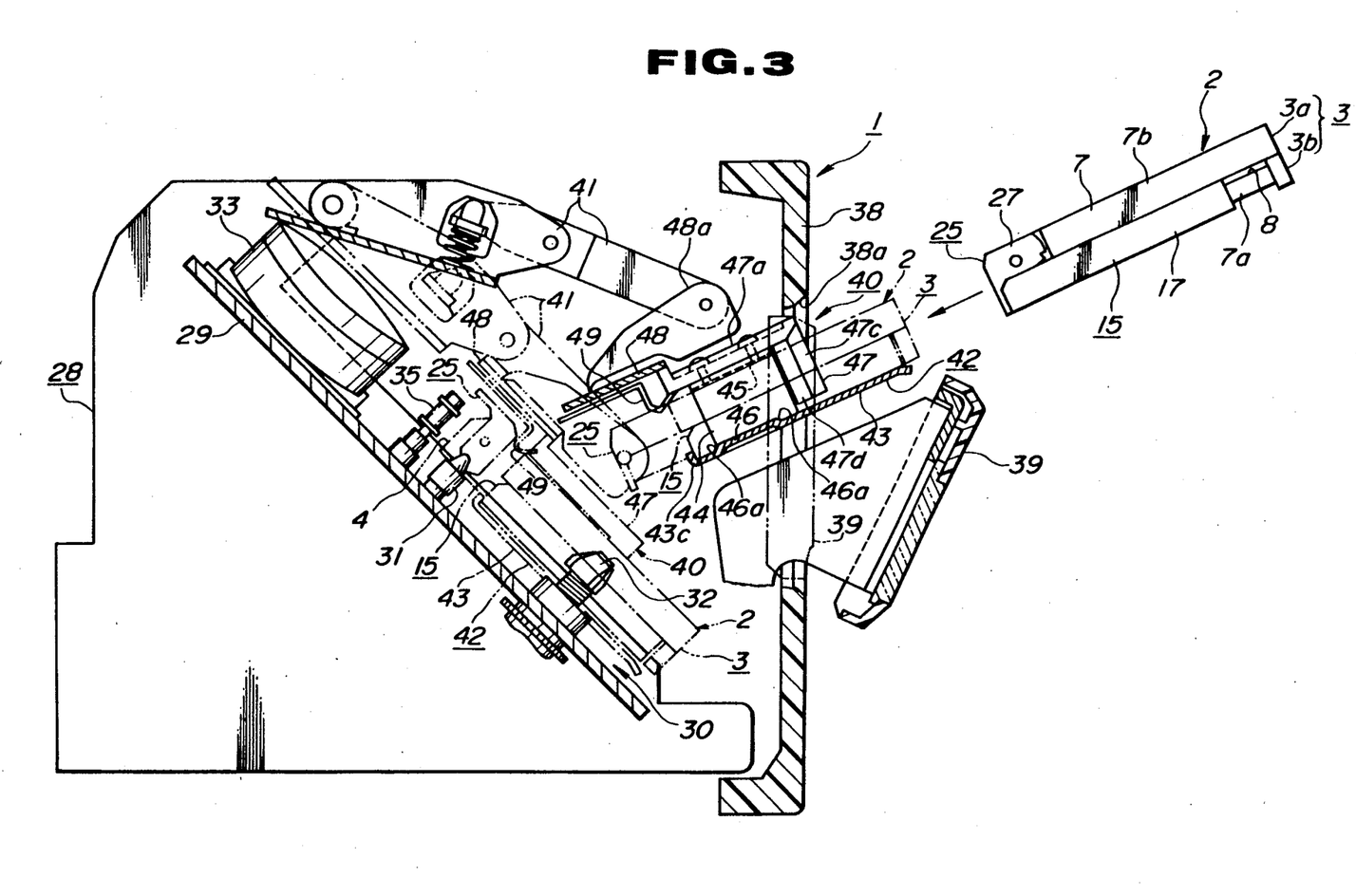
FIG. 3 is a section taken along line III—III of FIG. 1.
Figure 5A:
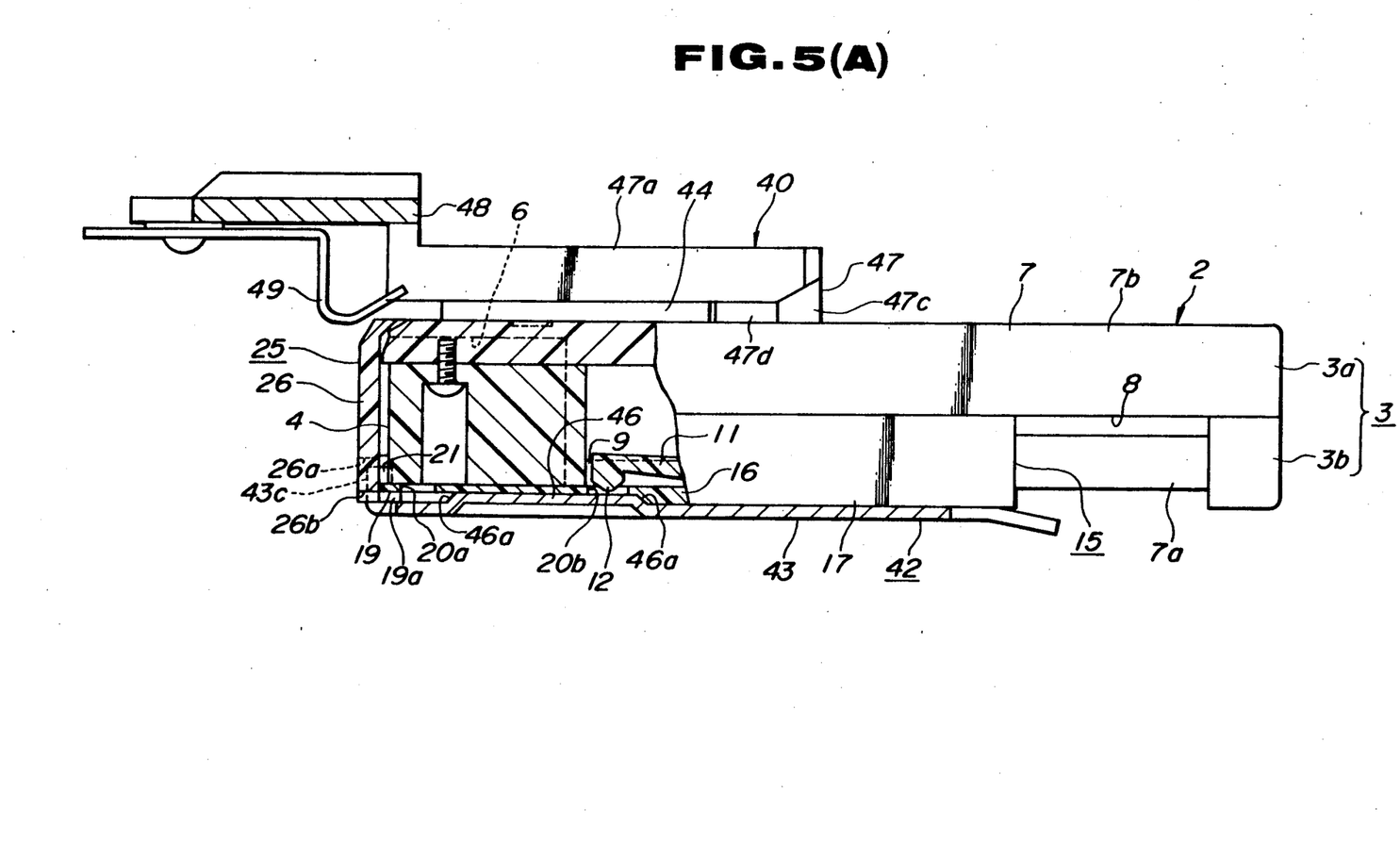
FIGS. 5(A) and 5(B) are sections taken along line v—v of FIG. 1.
Figure 5B:
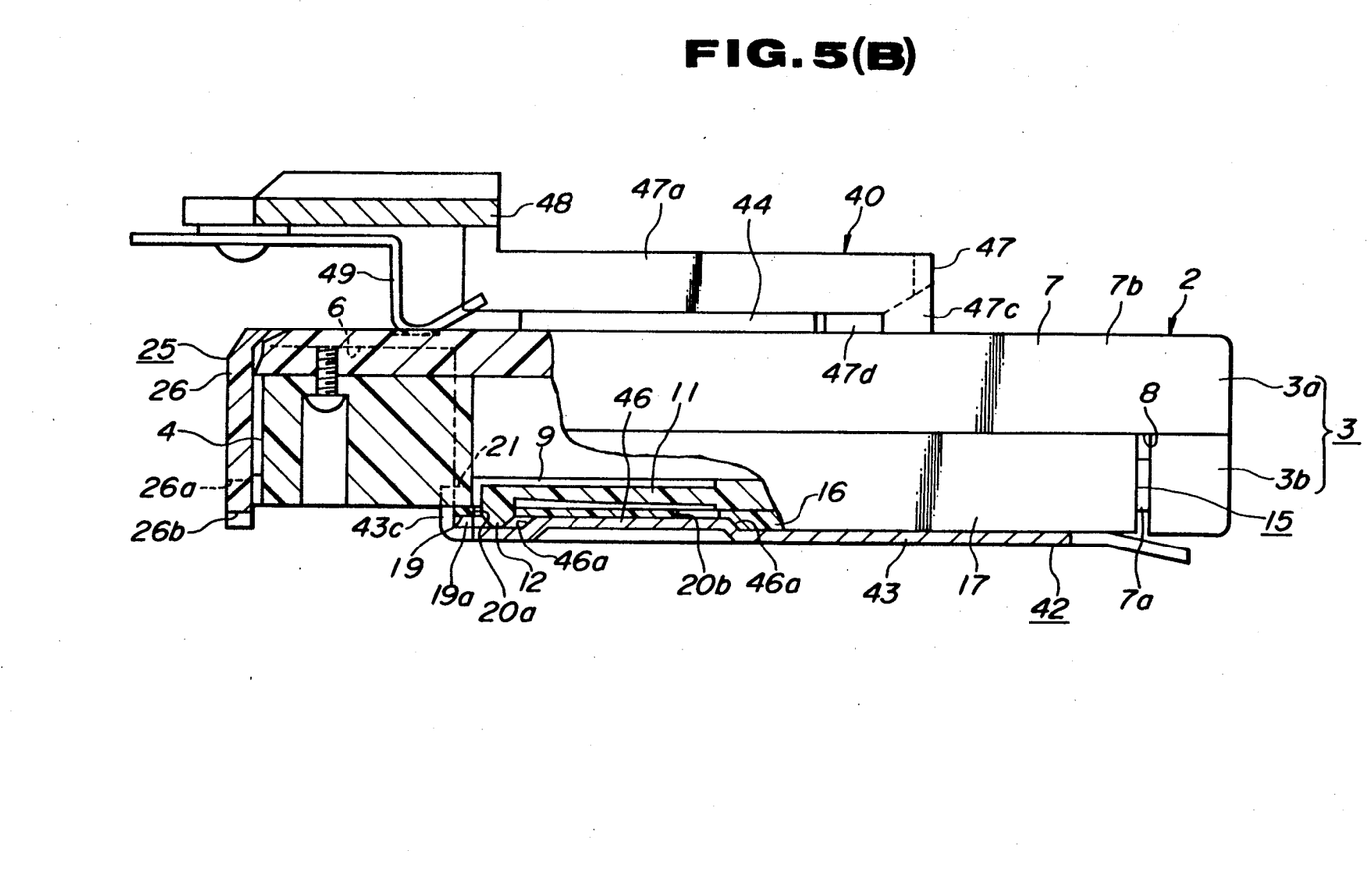

Upon insertion of the DAT cassette 2 into the cassette holder 40, the DAT cassette 2 is inserted as shown in FIG. 3. Then, the lock releasing projections 46 and 46' enter into the associated locking grooves 19 and 19'. The locking heads 12 of the locking claws 11 come into contact with the upper edge of the lock releasing projections 46 and 46' to be shifted upwardly. As a result, the lower ends of the locking heads 12 are placed flush with the bottom surface of the locking grooves 19 and 19'. As set forth, since the front and rear ends of the locking heads 12 are tapered or rounded, locking engagement between the locking heads 12 and the locking openings 20b and 20b' can be released by backward movement of the sliding shutter 15, as shown in FIG. 5(A). Just after releasing the locking engagement between the locking heads 12 and the locking openings 20b and 20b', the projections 21 come into contact with the extension pieces 43c of the bottom plate 43. By this contact, the sliding shutter 15 is prevented from shifting further relative to the bottom plate of the cassette holder 40. On the other hand, the cassette 2 travels further inwardly while leaving the sliding shutter 15 at the position where the contact between the projection 21 and the extension pieces 43c is established, as shown in FIG. 5. After a predetermined stroke of travel essentially corresponding to the length of the locking grooves 19 and 19', the locking heads 12 come into engagement with the locking holes 20a and 20a'. Therefore, the sliding shutter 15 is restricted frontward movement.

At this position, the lock releasing projections 46 and 46' are maintained in engagement with the locking grooves 19 and 19' for cooperation with the latter so as to restrict play movement of the DAT cassette 2 relative to the DAT cassette 2 holder 40 and thus accurately position the cassette within the cassette holder 40. For assuring engagement of the lock releasing projections 46 and 46' and the locking grooves 19 and 19', the narrower width of the lock releasing projection 46' serves for permitting slight offset of the DAT cassette 2 in a transverse direction and thus absorb tolerance. Namely, in the shown construction, the lock releasing projection 46 has a configuration and size essentially in conformance with that of the locking groove 19 and serves for determining the transverse position of the cassette 2 relative to the cassette holder. On the other hand, the tolerance in production can be absorbed by a clearance defined between the lock releasing projection 46' and the locking groove 19'. Moreover, at the set position, the DAT cassette 2 is depressed toward the bottom plate 43 by means of the bias spring 49. Therefore, the DAT cassette 2 can be firmly maintained within the cassette holder 40.

Thereafter, the cassette holder 40 is shifted to the loading position, and the cassette holder 40 carrying the DAT cassette 2 is placed within the cassette receptacle space 30 on the mechanical chassis 29. Then, the pivotal lid 25 is pivotally shifted to the open position, and the tape in the DAT cassette becomes accessible for recording and reproducing information thereon.

On the other hand, when the DAT cassette 2 is to be ejected. The cassette holder 40 is shifted away from the mechanical chassis 29 to the eject position where the cassette holder 40 is externally accessible. During this movement of the cassette holder 40, the pivotal lid 25 is moved into closed position. At this position, the DAT cassette 2 is pulled out from the cassette holder 40 by pulling the DAT cassette 2 along the surface of the bottom plate 43 of the cassette holder 40.

As the DAT cassette 2 moves outward, the lock releasing projections 46 and 46' again come into contact with the locking heads 12 which are in locking engagement with the locking holes 20a and 20a' to depress the latter upwardly. As a result, the sliding shutter 15 becomes free from restriction in sliding movement. Therefore, the sliding shutter 15 is shifted frontwardly by the spring force of the coil spring 24. Then, at the initial and closed position, the locking head 12 come into engagement with the locking holes 20b and 20b' of the sliding shutter 15 to restrict sliding movement.

As can be appreciated herefrom, the shown embodiment of the cassette holder can position the cassette therewithin without requiring any extra means for positioning the cassette. Therefore, the shown embodiment fulfills all of the objects and advantages sought therefor.

While the present invention has been discussed in terms of the preferred embodied of the invention, the invention can be embodied in various fashions. Therefore, the invention should be appreciated to include all of possible embodiments and modifications thereof which are implemented without departing from the principal of the invention.

For example, although the shown embodiment has been specifically discussed with respect to the cassette holder for DAT player, the invention may be applicable to any type of tape player for recording and reproducing information in tape cassettes having equivalent constructions as set forth above. Furthermore, the invention will not be restricted to the specific constructions of locking structure of the tape cassette and is applicable for various types of locking structures. For example, the cassette holder may handle the tape cassettes having the sliding shutter locking structures as disclosed in
U.S. Pat. No. 4,843,510;
European Patent First Publication 0 180 759;
British Patent 2,165,819; and
U.S. Pat. No. 4,714,213,
for example. The disclosure of the above-identified prior publications are herein incorporated by reference. Furthermore, the present invention is applicable to cassette holders disclosed in
U.S. Pat. No. 4,881,137;
U.S. Pat. No. 4,673,145;
U.S. Pat. No. 4,799,117; and
U.S. Pat. No. 4,935,895.
The disclosures of the above-identified U.S. Patents are also herein incorporated by reference.

What is claimed is:

1. A cassette holder for a tape player which records and reproduces information on a recording medium tape housed on tape reels within a cassette casing and protected by a pivotable lid on said cassette casing, said cassette casing having a sliding shutter for locking and unlocking said pivotable lid and, in some instances, for covering and uncovering said tape reels, comprising:
   a cassette holder body defining therein a tape cassette receptacle space, said cassette holder body having a bottom plate forming a bottom of said cassette receptacle space; and
   first and second projections projecting from said bottom plate of said cassette holder and oriented in a mutually spaced apart relationship to each other, said first and second projections being engageable with respective first and second grooves in said cassette casing in which locking heads for locking said sliding shutter at an open position and a closed position are projected, said first groove and said first projection having associated widths substantially in conformance to each other such that they engage one another in a close fitting fashion, and said second groove and said second projection having associated widths substantially different from each other such that they engage one another in a loose fitting fashion.

2. The cassette holder as set forth in claim 1, wherein said second projection is provided with a width narrower than a width of said second groove.

3. The cassette holder as set forth in claim 2, wherein the width of said second projection is approximately half of the width of said second groove.

4. A cassette holder for a tape player which records and reproduces information on a recording medium tape housed on tape reels within a cassette casing and protected by a pivotable lid on said cassette casing, said cassette casing having a sliding shutter for locking and unlocking said pivotable lid and, in some instances, for covering and uncovering said tape reels, comprising:
   a cassette holder body defining therein a tape cassette receptacle space, said cassette holder body having a bottom plate forming a bottom of said cassette receptacle space; and
   first and second projections projecting from said bottom plate of said cassette holder and oriented in a mutually spaced apart lateral relationship to each other, said second projection having a critical lateral dimension substantially less than a critical lateral dimension of said first projection, said first and second projections being engageable with respective associated first and second grooves in said cassette casing in which locking heads for locking said sliding shutter at an open position and a closed position are projected, said first and second grooves having substantially identical dimensions, said first projection critical lateral dimension substantially in conformance with an associated critical lateral dimension of said first groove such that said first projection and said first groove laterally engage one another in a close fitting fashion, said second projection critical lateral dimension substantially less than an associated lateral dimension of said second groove such that said second projection and said second groove engage one another in a loose fitting fashion.

5. The cassette holder as set forth in claim 4, wherein the critical lateral dimension of said second projection is approximately half of the critical lateral dimension of said first projection.

* * * * *